US010756896B2

(12) United States Patent
Pickhardt (10) Patent No.: US 10,756,896 B2
(45) Date of Patent: Aug. 25, 2020

(54) TRUSTLESS ACCOUNT RECOVERY

(71) Applicant: Jeff Pickhardt, Palo Alto, CA (US)

(72) Inventor: Jeff Pickhardt, Palo Alto, CA (US)

( * ) Notice: Subject to any disclaimer, the term of this patent is extended or adjusted under 35 U.S.C. 154(b) by 181 days.

(21) Appl. No.: 16/159,611

(22) Filed: Oct. 13, 2018

(65) Prior Publication Data
US 2020/0119916 A1  Apr. 16, 2020

Related U.S. Application Data

(60) Provisional application No. 62/744,657, filed on Oct. 12, 2018.

(51) Int. Cl.
| H04L 9/08 | (2006.01) |
| H04L 9/32 | (2006.01) |
| G06F 21/45 | (2013.01) |

(52) U.S. Cl.
CPC ............ *H04L 9/0894* (2013.01); *G06F 21/45* (2013.01); *H04L 9/3236* (2013.01)

(58) Field of Classification Search
CPC .............................. H04L 9/0894; H04L 9/3236
See application file for complete search history.

(56) References Cited

U.S. PATENT DOCUMENTS

| 10,439,812 | B2 * | 10/2019 | Patin | H04L 9/0637 |
| 10,460,126 | B2 * | 10/2019 | Pead | H04L 67/20 |
| 10,546,296 | B2 * | 1/2020 | Narasimhan | G06Q 20/4014 |
| 10,554,394 | B1 * | 2/2020 | Krut | H04L 9/3239 |
| 10,644,885 | B2 * | 5/2020 | Cheng | G06F 21/52 |
| 2014/0122346 | A1 * | 5/2014 | O'Brien | G06Q 30/0645 |
| | | | | 705/307 |
| 2016/0156514 | A1 * | 6/2016 | Salonidis | H04L 41/12 |
| | | | | 709/223 |
| 2017/0048235 | A1 * | 2/2017 | Lohe | G06Q 20/10 |
| 2017/0345011 | A1 * | 11/2017 | Salami | G06Q 20/10 |
| 2018/0131513 | A1 * | 5/2018 | Wallrich | H04L 9/0825 |
| 2018/0211313 | A1 * | 7/2018 | Narahari | G06Q 40/025 |
| 2019/0036887 | A1 * | 1/2019 | Miller | G06Q 20/06 |
| 2019/0080392 | A1 * | 3/2019 | Youb | G06Q 40/00 |
| 2019/0245688 | A1 * | 8/2019 | Patin | H04L 9/0637 |
| 2019/0392178 | A1 * | 12/2019 | Rice | G06F 21/604 |
| 2019/0392438 | A1 * | 12/2019 | Rice | G06Q 20/3825 |

(Continued)

OTHER PUBLICATIONS

Muneeb Ali et al., "Blockstack: A New Internet for Decentralized Applications", Blockstack Technical Whitepaper, Oct. 12, 2017, Whitepaper Version 1.1 (https://blockstack.org).

(Continued)

*Primary Examiner* — Ali Shayanfar
(74) *Attorney, Agent, or Firm* — Cognition IP, P.C.; Bryant Lee (57) ABSTRACT

A system and method may be used to recover access to an account. A recovery challenge may be received from a submitter, including an escrow deposit, and the recovery challenge may be broadcast to other users. During a monitoring period, the system may monitor for a recovery response proving ownership of the account. If a recovery response is received then the submitter of the recovery response may maintain ownership of the account and receive a portion of the escrow deposit. If no valid recovery response is received during the monitoring period, then ownership of the account may be transferred to the submitter of the recovery challenge.

19 Claims, 10 Drawing Sheets

(56) References Cited

U.S. PATENT DOCUMENTS

2019/0392536 A1* 12/2019 Rice .................. H04L 67/22
2020/0099511 A1* 3/2020 Jarry-Lacombe ...........................
                                                    G06F 21/6209
2020/0127835 A1* 4/2020 Fletcher .............. H04L 9/085

OTHER PUBLICATIONS

Marie Vasek et al., "The Bitcoin Brain Drain: A Short Paper on the Use and Abuse of Bitcoin Brain Wallets" (accessed Nov. 27, 2018) (http://fc16.ifca.ai/preproceedings/36_Vasek.pdf).
Harry Kalodner et al., "An empirical study of Namecoin and lessons for decentralized namespace design", Princeton University (accessed Nov. 27, 2018) (https://www.coss.io/documents/white-papers/namecoin.pdf).
Joseph Bonneau et al., "Secrets, Lies, and Account Recovery: Lessons from the Use of Personal Knowledge Questions at Google", Proceedings of the 22nd International Conference on World Wide Web, May 18-22, 2015 (https://ai.google/research/pubs/pub43783).
Shayan Eskandari et al., "A First Look at the Usability of Bitcoin Key Management", ARXIV, Feb. 12, 2018, (https://arxiv.org/pdf/1802.04351.pdf).

* cited by examiner

TRUSTLESS ACCOUNT RECOVERY

CROSS-REFERENCE TO RELATED APPLICATIONS

This application claims the benefit of U.S. Provisional Application No. 62/744,657, filed on Oct. 12, 2018, which is hereby incorporated by reference in its entirety.

BACKGROUND

For users of cryptographically protected accounts, and other electronic accounts, loss of passwords or private keys resulting in loss of account access or control is a common problem. For account providers, it is important to provide a mechanism for users to recover accounts in order to promote user trust and mass adoption.

Existing mechanisms for account recovery do not offer trustless, distributed operation. Many existing mechanisms rely on keeping additional records or trusting a centralized service to prove identity. For example, making a back-up of the private key may be insecure and depends on the user, who may forget to create or lose the back-up; designating a second recovery account relies on provider of second account and may disclose identity; or designating identity verification questions relies on the provider of questions and may be brute-forced or socially engineered. These mechanisms may be unreliable, may rely on trusting a single source of truth, or may not work in a distributed system.

A trustless, decentralized account recovery mechanism may be beneficial as a replacement for or complement to existing mechanisms. For example, in blockchain based accounts, which are natively designed to be trustless and decentralized, existing mechanisms may compromise the benefits of the blockchain based accounts. In another example, traditional, centralized accounts may also benefit by using a trustless, decentralized mechanism in combination with existing mechanisms.

SUMMARY

One embodiment relates a computer-implemented method and system for account recovery suitable for use in a trustless, decentralized system. The method and system may also be used for centralized systems.

In one embodiment, a computer-implemented method is used for recovery access to an electronic account. The account may be protected by a secret key or password. A user may transmit a recovery challenge to attempt to gain access to the account that he had forgotten the secret key or password for. Thus, a recovery challenge may be received from a first submitter, where the recovery challenge may comprise an identifier of the account, an escrow deposit, and a recovery mechanism. In order to prevent fraudulent and malicious attacks, the system may provide for this recovery challenge to be sent to other users, so that if a different user is the real owner of the account, this user can prove ownership of the account, such as by using the secret key or password. Thus, the recovery challenge may be broadcast to other users on a network and a monitoring period may be entered. During this period recovery responses may be transmitted by users in order to prove ownership of the account and therefore end pending recovery challenges. If a recovery response is received from a second submitter during the monitoring period, and the recovery response is verified by authentication information such as a key or password, then a portion of the escrow amount may be forfeited by the first submitter and the recovery challenge ends. The forfeiting of the escrow amount, or a portion of it, discourages malicious attacks. However, if no recovery response is received during the monitoring period, then ownership of the account may be transferred to the first submitter using the recovery mechanism.

In some embodiments, a secret sharing mechanism is provided. In such an embodiment, an account recovery secret may be required to perform a recovery challenge. The account recovery secret may be recoverable from a plurality of secret parts that may be distributed across multiple services or locations. In some embodiments, only a subset of all secret parts are required to reconstruct the account recovery secret. In some embodiments, challenge questions are presented to the user for the user to prove identity and receive one or more of the secret parts from a service storing the one or more secret parts.

Further areas of applicability of the present disclosure will become apparent from the detailed description, the claims and the drawings. The detailed description and specific examples are intended for illustration only and are not intended to limit the scope of the disclosure.

DETAILED DESCRIPTION

Figure 1:
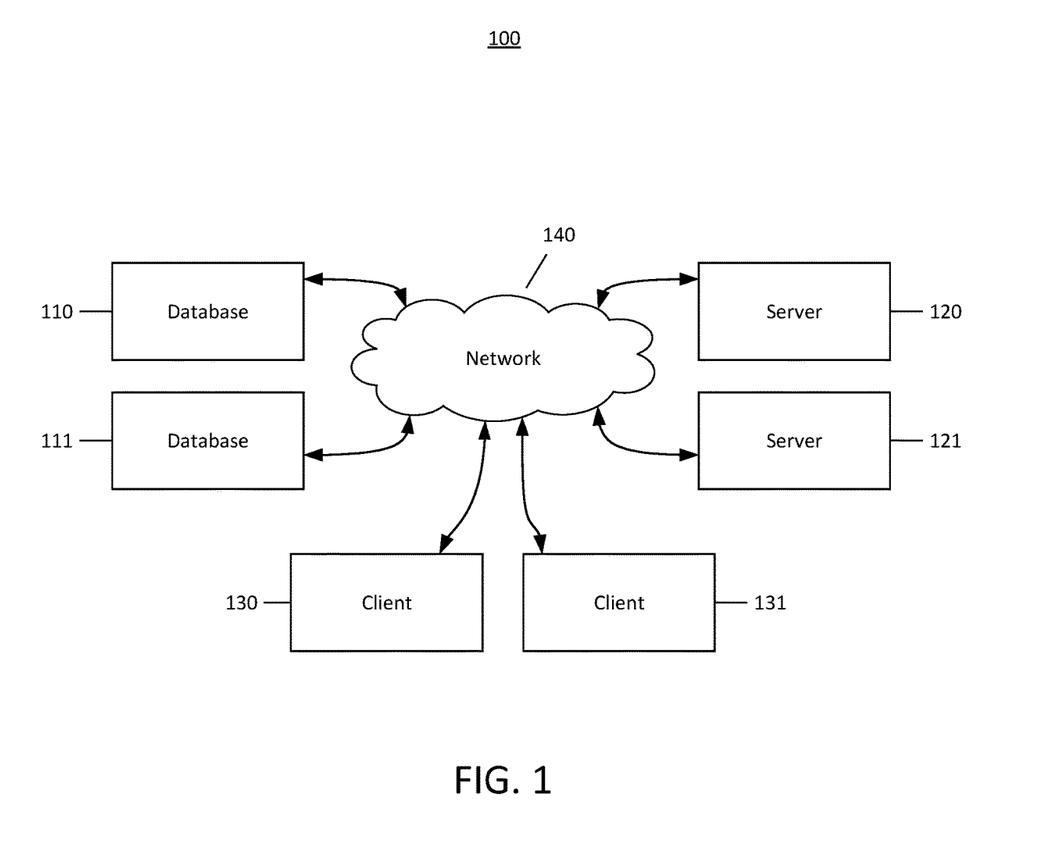
FIG. 1 illustrates an exemplary network environment in which some embodiments may operate.

FIG. 1 illustrates an exemplary network environment 100 in which the systems and methods herein may operate. The network environment may include one or more clients and servers connected via a network 140. The network 140 may include a local area network (LAN), a wide area network (WAN), a telephone network, such as the Public Switched Telephone Network (PSTN), an intranet, the Internet, or a combination of networks. The network 140 may include various entities such as databases 110, 111, servers 120, 121 and clients 130, 131. In some embodiments, clients may also act as servers, such as in a peer-to-peer system. In an embodiment, databases 110, 111 may store data such as account authentication credentials or account contents. In an embodiment, databases 110, 111 may comprise blockchain databases. In an embodiment, servers 120, 121 may process account logins and serve account content. In an embodiment, servers 120, 121 may comprise blockchain processing nodes. In an embodiment, clients 130, 131 may access accounts and view or modify account content.

Figure 2:
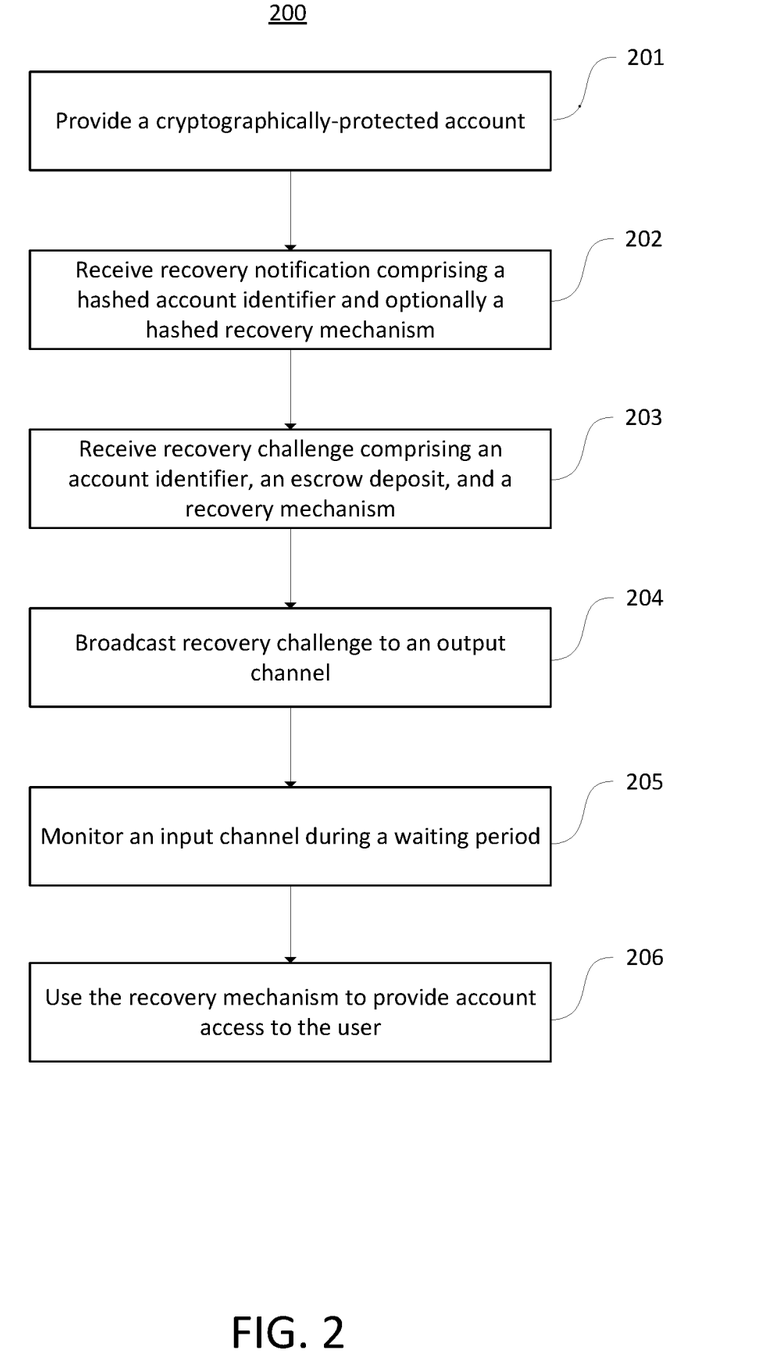
FIG. 2 illustrates an exemplary method that may be used in one embodiment.

FIG. 2 illustrates an exemplary method 200 that may be used in one embodiment. In step 201, a cryptographically protected account is provided, which a user such as an account owner may wish to recover or gain access to. Cryptographic protection may be provided by public key cryptography, private key cryptography, or other forms of cryptography. The account may comprise an account identifier such as a username, address, or unique string, a plurality of authentication data such as data used to verify access, and a plurality of content data such as files, messages, transaction history, or permissions for adding, viewing, modifying, or deleting content data. In an embodiment, the account may be protected by public-key cryptography, and authentication data may comprise a public key. In an embodiment, the account may be protected by a password, and authentication data may comprise the password or a cryptographically protected version of the password such as a hash or salted hash. In an embodiment, the account may be configured with a minimum waiting duration and a minimum recovery escrow value.

In step 202, a recovery notification is received by a system of servers from the user. In an embodiment, a user's client computer is responsible for transmitting or broadcasting the recovery notification to the servers. The recovery notification may comprise a hashed or encrypted account identifier. Hashing refers to the process of applying a hash function to a value to produce a hashed value. Hashes are used to map data from one value to another. One-way hashes are one form of hash that are easy to compute in one direction, but are computationally difficult or infeasible to compute in the opposite direction. In some embodiments, the recovery notification may additionally comprise a hashed or encrypted recovery mechanism. The recovery mechanism may be used to assist the user in regaining access to the account. For example, the recovery mechanism may comprise a replacement public key, a replacement password, or contact information such as a trusted email address or phone number through which a password may be reset. In some embodiments, a timestamp may be recorded of when the recovery notification is received.

In step 203, a recovery challenge is received by a system of servers from the user. In an embodiment, a user's client computer is responsible for transmitting or broadcasting the recovery challenge to the servers. The recovery challenge may comprise a pre-hash or unencrypted account identifier, an escrow transaction or deposit, and a pre-hash or unencrypted recovery mechanism. The pre-hash account identifier and optionally the pre-hash recovery mechanism may be verified against the account notification. For example, the pre-hash account identifier or recovery mechanism may be verified by applying a hashing function and comparing a result of the hashing function to the hashed account identifier or recovery mechanism from the recovery notification. The escrow deposit may comprise an electronic payment, a cryptocurrency transaction, a deposit in an escrow account, a smart contract that is self-executing and cannot be stopped or rolled back, or other transfer or store of value. In an embodiment, the value of the escrow deposit may be at least the minimum recovery escrow value configured in the account.

In step 204, the recovery challenge may be broadcast to an output channel by the system of servers. The output channel may comprise a blockchain, an email list, a message board, a website, a web server, a database, an API, a push notification, or other mechanism for one-to-many communication. In step 205, an input channel may be monitored during a waiting period. In an embodiment, the waiting period may be at least the minimum waiting duration configured in the account. In step 206, when the waiting period elapses, the recovery mechanism may be used to provide account access to the user, and at least a portion of the escrow deposit may be returned or paid to the account. In an embodiment, the escrow deposit may be paid to the account by assigning the value of the escrow deposit to the account directly, or a mechanism may be provided allowing assignment of the value to a preferred destination. In an embodiment, a portion of the escrow deposit may be assigned as a fee to a third party such as a system administrator.

Figure 3:
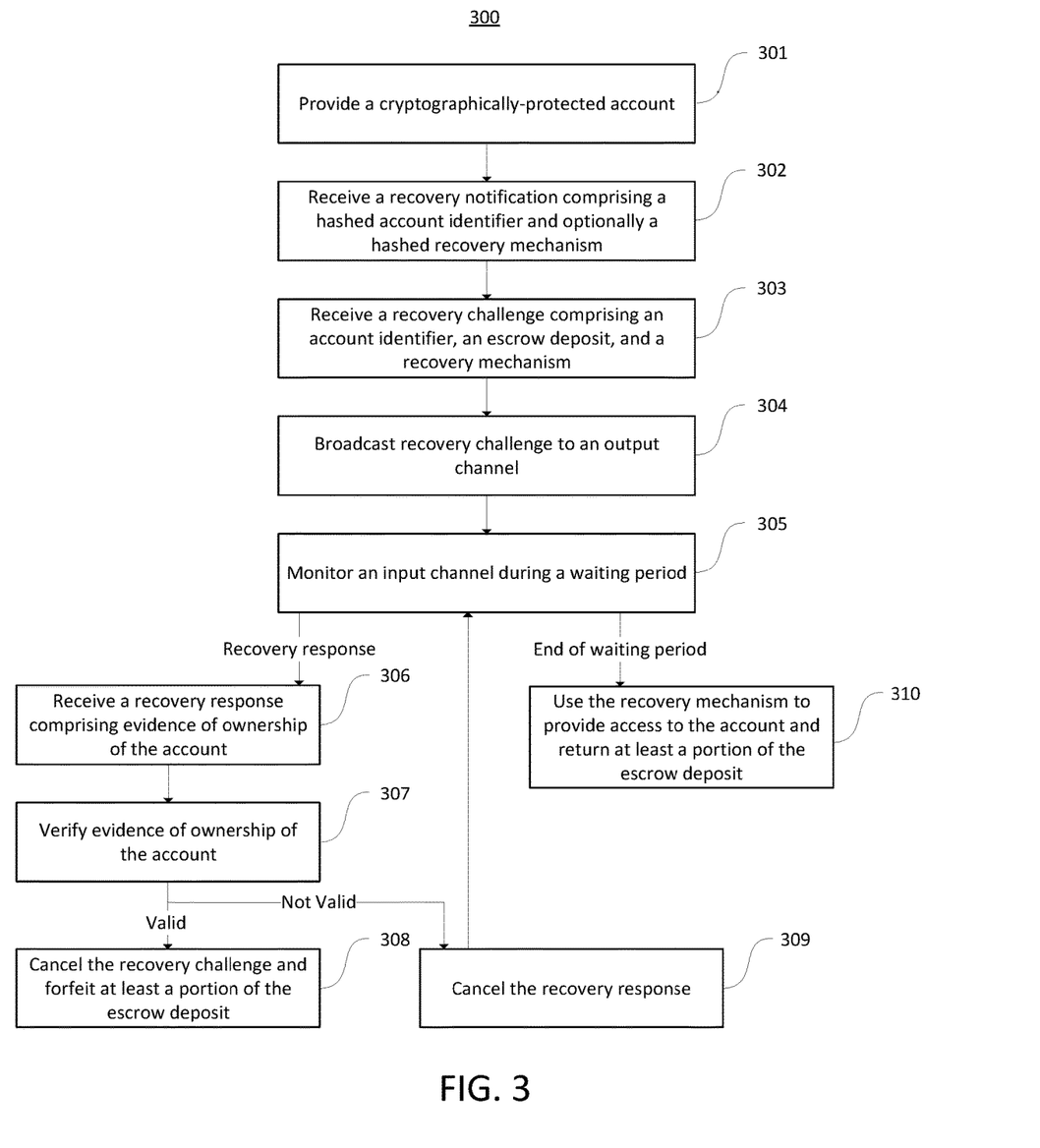
FIG. 3 illustrates an exemplary method that may be used in one embodiment.

FIG. 3 illustrates an exemplary method 300 that may be used in one embodiment. In step 301, a cryptographically protected account is provided, which a first user may wish to gain access to. The cryptographically protected account may be provided on a decentralized network, such as a blockchain, or on centralized systems. In an example, the first user may comprise an attacker or user other than an owner of the account. A second user may comprise the account owner, and the second user may wish to retain access to the account. The account may comprise an account identifier such as a username or unique string, a plurality of authentication data such as data used to verify access, and a plurality of content data such as files, messages, transaction history, or permissions for adding, viewing, modifying, or deleting content data. In an embodiment, the account may be protected by public-key cryptography, and authentication data may comprise a public key. In an embodiment, the account may be protected by a password, and authentication data may comprise the password or a cryptographically protected version of the password such as a hash or salted hash.

In step 302, a recovery notification is received by a system of servers from the first user. In an embodiment, a user's client computer is responsible for transmitting or broadcasting the recovery notification to the servers. The recovery notification may comprise a hashed or encrypted account identifier. In some embodiments, the recovery notification may additionally comprise a hashed or encrypted recovery mechanism. The recovery mechanism may be used to assist the user in regaining access to the account. For example, the recovery mechanism may comprise a replacement public key, a replacement password, or contact information such as a trusted email address or phone number through which a password may be reset. In some embodiments, a timestamp may be recorded of when the recovery notification is received.

In step 303, a recovery challenge is received by a system of servers from the first user. In an embodiment, a user's client computer is responsible for transmitting or broadcasting the recovery challenge to the servers. The recovery challenge may comprise a pre-hash or unencrypted account identifier, an escrow transaction or deposit, and a pre-hash or unencrypted recovery mechanism. The pre-hash account identifier and optionally the pre-hash recovery mechanism may be verified against the account notification. For example, the pre-hash account identifier or recovery mechanism may be verified by applying a hashing function and comparing a result of the hashing function to the hashed account identifier or recovery mechanism from the recovery notification. The escrow deposit may comprise an electronic payment, a cryptocurrency transaction, a deposit in an escrow account, a smart contract that is self-executing and cannot be stopped or rolled back, or other transfer of value. In an embodiment, the escrow deposit may comprise a value of at least the minimum recovery escrow value configured in the account.

In step 304, the recovery challenge may be broadcast to an output channel by the system of servers. The output channel may comprise a blockchain, an email list, a message board, a website, a web server, a database, an API, a push notification, or other mechanism for one-to-many communication. In step 305, an input channel may be monitored during a waiting period. In an embodiment, the waiting period may be at least the minimum waiting duration configured in the account. In step 306, a recovery response is received by the system of servers. In an embodiment, a user's client computer is responsible for transmitting or broadcasting the recovery response to the servers. The recovery response may comprise evidence of ownership of the account, such as a secret key or proof of private key ownership by using the private key to decrypt a value encrypted by the public key or encrypt a value that can be decoded by the public key, a password, a login to the account, or other evidence of ownership. In an example, the recovery response may be received from the second user or account owner. In step 307, the evidence of ownership in the recovery response is verified by one or more servers. In an embodiment, the evidence of ownership may be verified by comparing the evidence of ownership to the authentication data in the account.

In step 308, when the evidence of ownership is valid, the first user forfeits all, or at least a portion, of the payment made into escrow. The funds may be transferred into any account not owned by the first user, or may be retained in the escrow account. In an embodiment, at least a portion of the escrow deposit may be paid to the account at issue, and the recovery challenge is ended. In an embodiment, the escrow deposit may be paid to the account by assigning the value of the escrow deposit to the account directly, or a mechanism may be provided allowing assignment of the value to a preferred destination. In an embodiment, a portion of the escrow deposit may be assigned as a fee to a third party such as a system administrator.

In step 309, when the evidence of ownership is not valid, the recovery response is canceled. Steps 305-309 may be repeated. In step 310, when the waiting period elapses without a valid recovery response, the recovery mechanism may be used to provide account access to the first user and at least a portion of the escrow deposit may be returned or paid to the account. In an embodiment, the escrow deposit may be paid to the account by assigning the value of the escrow deposit to the account directly, or a mechanism may be provided allowing assignment of the value to a preferred destination. In an embodiment, a portion of the escrow deposit may be assigned as a fee to a third party such as a system administrator.

Figure 4:
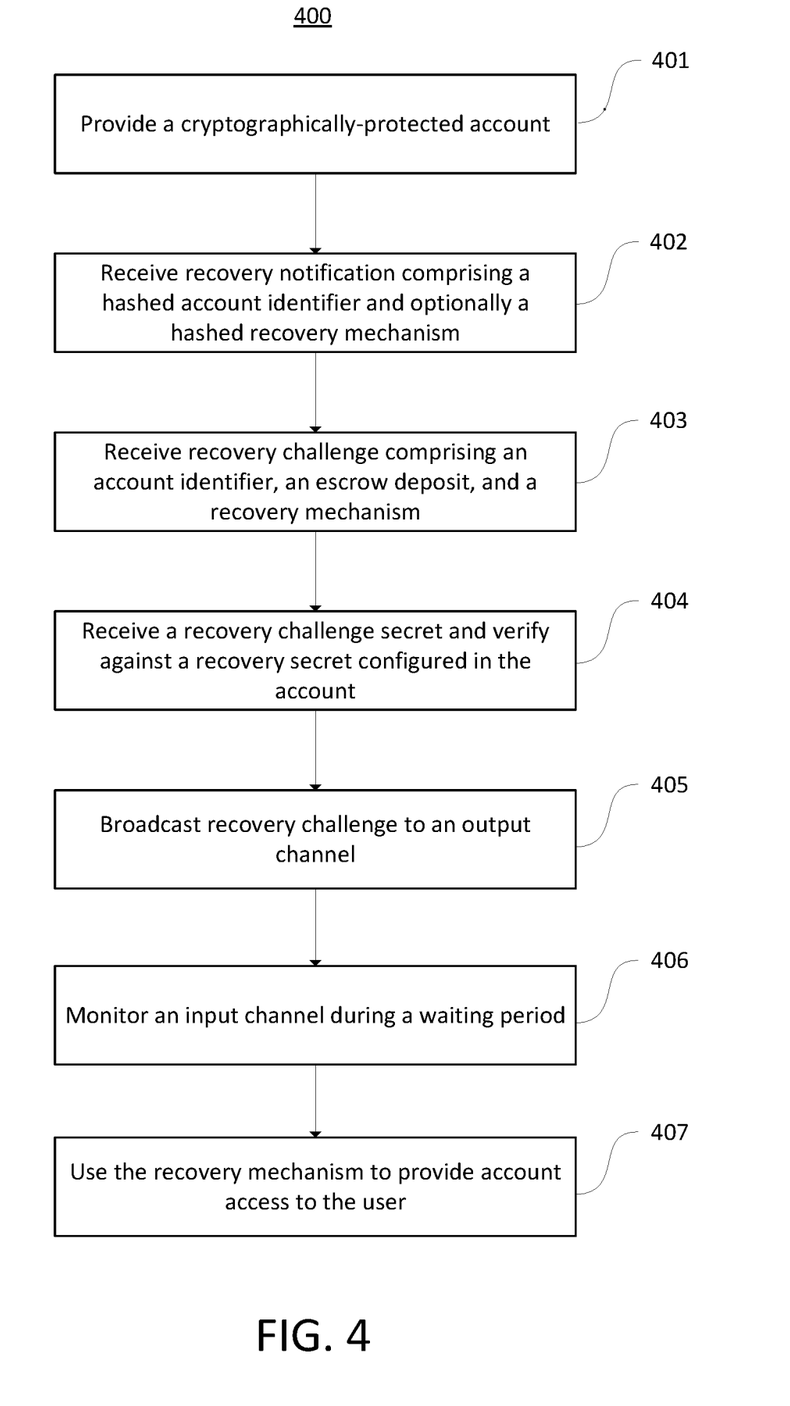
FIG. 4 illustrates an exemplary method that may be used in one embodiment.

FIG. 4 illustrates an exemplary method 400 that may be used in one embodiment. In step 401, a cryptographically protected account is provided, which a user such as an account owner may wish to recover or gain access to. The cryptographically protected account may be provided on a decentralized network, such as a blockchain, or on centralized systems. The account may comprise an account identifier such as a username, address, or unique string, a plurality of authentication data such as data used to verify access, and a plurality of content data such as files, messages, transaction history, or permissions for adding, viewing, modifying, or deleting content data. In an embodiment, the account may be protected by public-key cryptography, and authentication data may comprise a public key. In an embodiment, the account may be protected by a password, and authentication data may comprise the password or a cryptographically protected version of the password such as a hash or salted hash. In an embodiment, the account may be configured with a minimum waiting duration and a minimum recovery escrow value. In an embodiment, the account may be configured with a recovery secret, which may comprise a unique or random key. In an embodiment, the recovery secret may be stored in a hashed, encrypted, or otherwise cryptographically protected format. In an embodiment, the recovery secret may be split using a secret sharing algorithm into a plurality of secret parts, wherein a threshold subset of the secret parts may be used to reconstruct the recovery secret.

In step 402, a recovery notification is received by a system of servers from the user. In an embodiment, a user's client computer is responsible for transmitting or broadcasting the recovery notification to the servers. The recovery notification may comprise a hashed or encrypted account identifier. In some embodiments, the recovery notification may additionally comprise a hashed or encrypted recovery mechanism. The recovery mechanism may be used to assist the user in regaining access to the account. For example, the recovery mechanism may comprise a replacement public key, a replacement password, or contact information such as a trusted email address or phone number through which a password may be reset. In some embodiments, a timestamp may be recorded of when the recovery notification is received.

In step 403, a recovery challenge is received by a system of servers from the user. In an embodiment, a user's client computer is responsible for transmitting or broadcasting the recovery challenge to the servers. The recovery challenge may comprise a pre-hash or unencrypted account identifier, an escrow transaction or deposit, and a pre-hash or unencrypted recovery mechanism. The pre-hash account identifier and optionally the pre-hash recovery mechanism may be verified against the account notification. The escrow deposit may comprise an electronic payment, a cryptocurrency transaction, a deposit in an escrow account, a smart contract that is self-executing and cannot be stopped or rolled back, or other transfer of value. In an embodiment, the value of the escrow deposit may be at least the minimum recovery escrow value configured in the account.

In step 404, a recovery challenge secret is received by the system of servers from the user and verified, by one or more of the servers, against the recovery secret. The recovery challenge secret may comprise the recovery secret or a subset of secret parts. In an embodiment, when the challenge secret comprises a subset of secret parts, the subset of secret parts must comprise at least a threshold subset of secret parts needed to reconstruct the recovery secret to be successful. The subset of secret parts may be combined together to construct a value that is verified against the recovery secret. In an embodiment, at least a portion of the recovery secret or the subset of secret parts may be received from one or more third party sources on behalf of the user. For example, the recovery secret or subset of secret parts may be received from one or more password managers, backup storage providers, authenticators, or other sources.

In step 405, the recovery challenge may be broadcast to an output channel by the system of servers. The output channel may comprise a blockchain, an email list, a message board, a website, a web server, a database, an API, a push notification, or other mechanism for one-to-many communication. In step 406, an input channel may be monitored during a waiting period. In an embodiment, the waiting period may be at least the minimum waiting duration configured in the account. In step 407, when the waiting period elapses, the recovery mechanism may be used to provide account access to the user and at least a portion of the escrow deposit may be returned or paid to the account. In an embodiment, the escrow deposit may be paid to the account by assigning the value of the escrow deposit to the account directly, or a mechanism may be provided allowing assignment of the value to a preferred destination. In an embodiment, a portion of the escrow deposit may be assigned as a fee to a third party such as a system administrator.

Figure 5A:
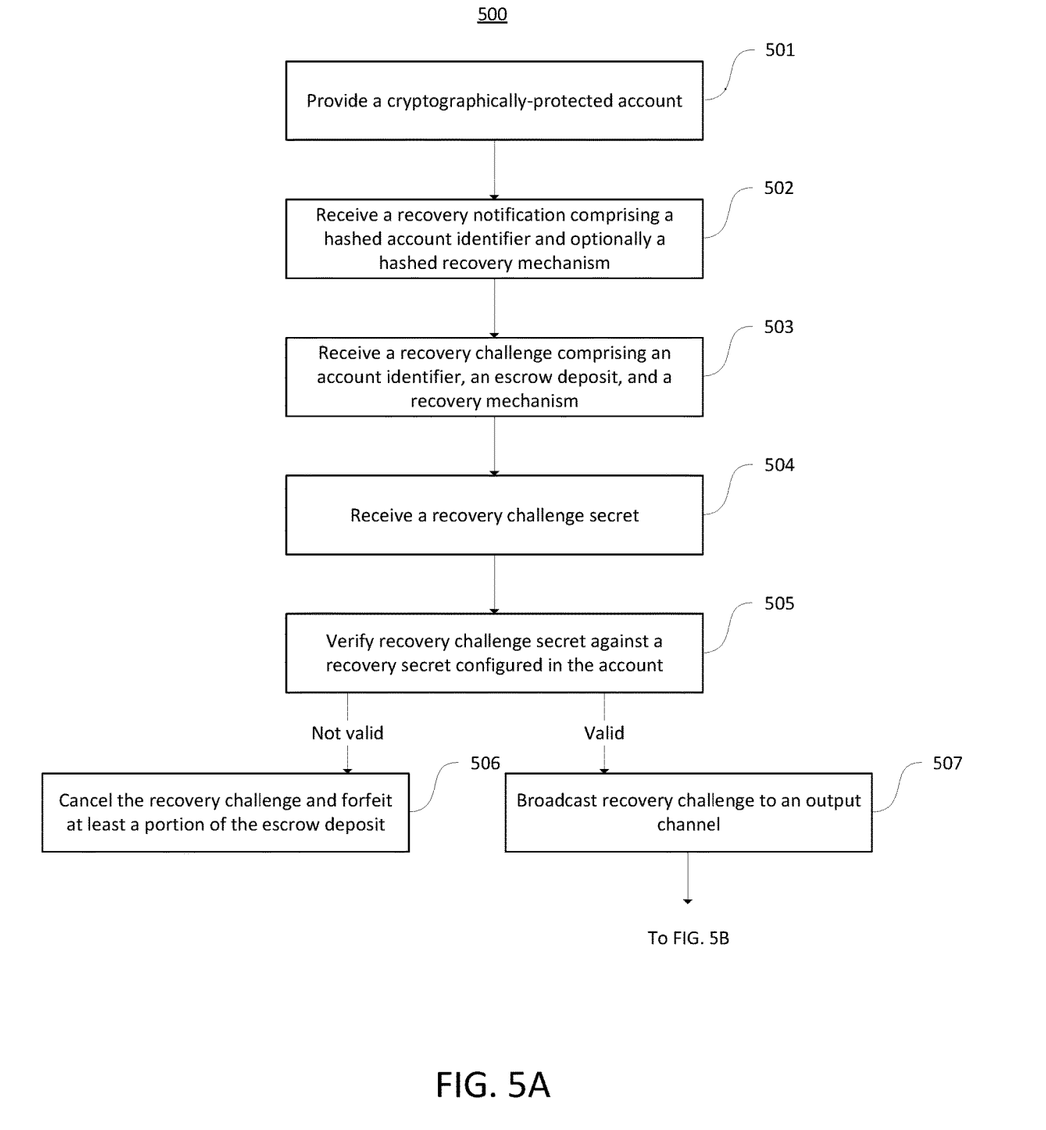
FIGS. 5A-B illustrate an exemplary method that may be used in one embodiment.
Figure 5B:
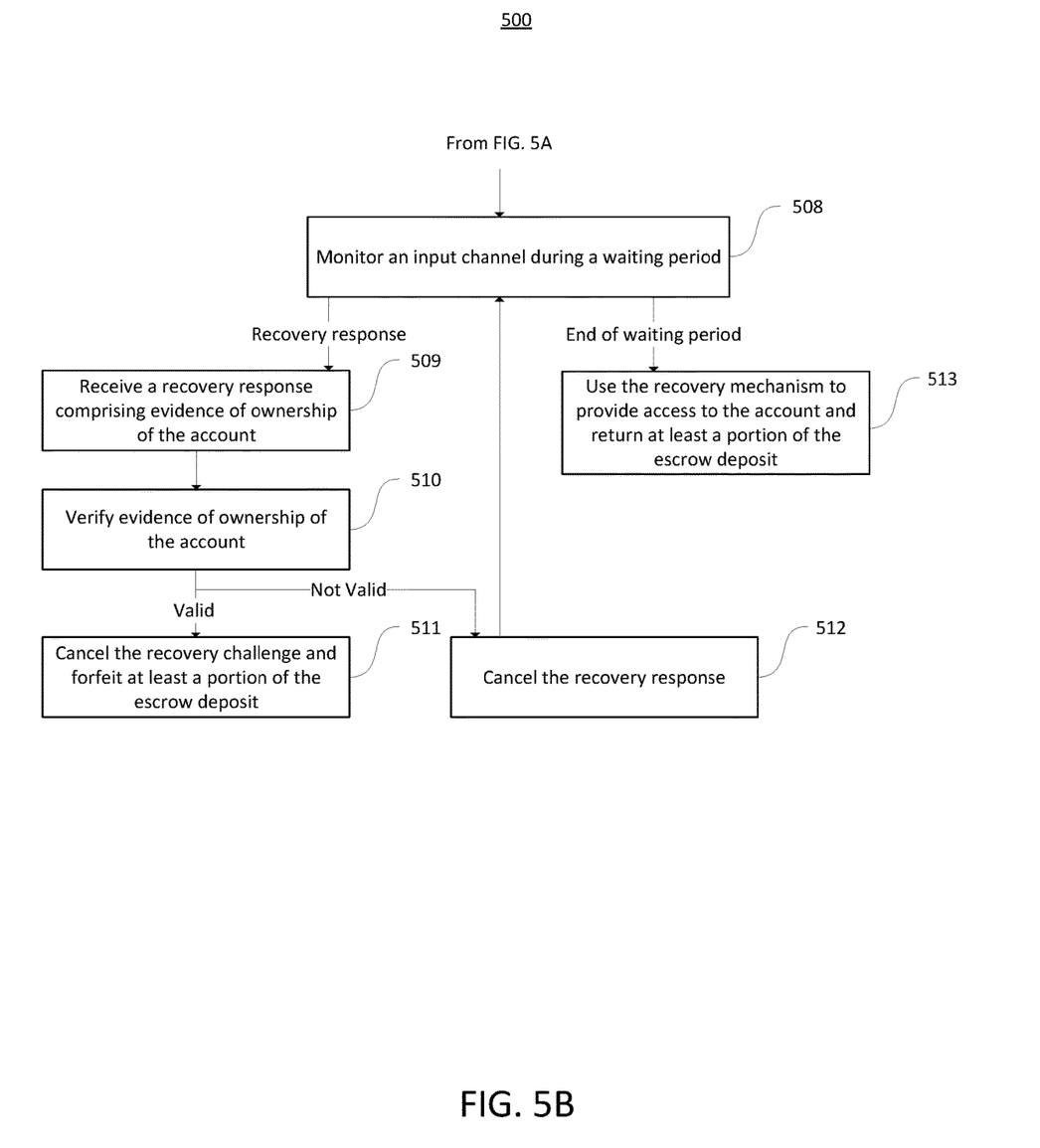

FIGS. 5A-B illustrate an exemplary method 500 that may be used in one embodiment. In step 501, a cryptographically protected account is provided, which a first user may wish to gain access to. The cryptographically protected account may be provided on a decentralized network, such as a blockchain, or on centralized systems. In an example, the first user may comprise an attacker or user other than an owner of the account. A second user may comprise the account owner, and the second user may wish to retain access to the account. The account may comprise an account identifier such as a username or unique string, a plurality of authentication data such as data used to verify access, and a plurality of content data such as files, messages, transaction history, or permissions for adding, viewing, modifying, or deleting content data. In an embodiment, the account may be protected by public-key cryptography, and authentication data may comprise a public key. In an embodiment, the account may be protected by a password, and authentication data may comprise the password or a cryptographically protected version of the password such as a hash or salted hash. In an embodiment, the account may be configured with a recovery secret, which may comprise a unique or random key. In an embodiment, the recovery secret may be stored in a hashed, encrypted, or otherwise cryptographically protected format. In an embodiment, the recovery secret may be split using a secret sharing algorithm into a plurality of secret parts, wherein a threshold subset of the secret parts may be used to reconstruct the secret.

In step 502, a recovery notification is received by a system of servers from the first user. In an embodiment, a user's client computer is responsible for transmitting or broadcasting the recovery notification to the servers. The recovery notification may be used to prevent or deter front-running by miners on a blockchain, or other decentralized network, or other network operators. If a network operator reads a recovery challenge from a user, the network operator could place its own recovery challenge ahead of that of the user, prior to placing the user's challenge on the network. To address this problem, users may be required to submit recovery notification messages prior to a recovery challenge, where the recovery notification is a hashed or encrypted version of the recovery challenge. This provides proof that the recovery challenge was submitted, without revealing its contents. The recovery notification may comprise a hashed or encrypted account identifier. In some embodiments, the recovery notification may additionally comprise a hashed or encrypted recovery mechanism. The recovery mechanism may be used to assist the user in regaining access to the account. For example, the recovery mechanism may comprise a replacement public key, a replacement password, or contact information such as a trusted email address or phone number through which a password may be reset. In some embodiments, a timestamp may be recorded of when the recovery notification is received.

In step 503, a recovery challenge is received by a system of servers from the first user. In an embodiment, a user's client computer is responsible for transmitting or broadcasting the recovery challenge to the servers. The recovery challenge may comprise a pre-hash or unencrypted account identifier, an escrow transaction or deposit, and a pre-hash or unencrypted recovery mechanism. The pre-hash account identifier and optionally the pre-hash recovery mechanism may be verified against the account notification. The escrow deposit may comprise an electronic payment, a cryptocurrency transaction, a deposit in an escrow account, a smart contract that is self-executing and cannot be stopped or rolled back, or other transfer of value. In an embodiment, escrow deposit may comprise a value of at least the minimum recovery escrow value configured in the account.

In step 504, a recovery challenge secret is received by a system of servers from the first user. In an embodiment, a user's client computer is responsible for transmitting or broadcasting the recovery challenge secret to the servers. The recovery challenge secret may comprise the recovery secret or a subset of secret parts. In an embodiment, when the challenge secret comprises a subset of secret parts, the subset of secret parts must comprise at least a threshold subset of secret parts needed to reconstruct the recovery secret to be successful. In an embodiment, at least a portion of the recovery secret or the subset of secret parts may be received from one or more third party sources on behalf of the user. For example, the recovery secret or subset of secret parts may be received from one or more password managers, backup storage providers, authenticators, or other sources.

In step 505, the recovery challenge secret may be verified by the system of servers. In an embodiment, the recovery challenge secret may be compared with the recovery secret. In an embodiment, the recovery challenge secret may be reconstructed from the subset of secret parts and the result may be compared with the recovery secret. In an embodiment, a hash, an encryption, other cryptographic mechanism, or other transformation may be applied to the recovery challenge secret before comparing with the recovery secret.

In step 506, when the recovery challenge secret is not valid, the first user forfeits all, or at least a portion, of the payment made into escrow. The funds may be transferred into any account not owned by the first user, or may be retained in the escrow account. In an embodiment, at least a portion of the escrow deposit may be paid to the account, and the recovery challenge is ended. In an embodiment, the escrow deposit may be paid to the account by assigning the value of the escrow deposit to the account directly, or a mechanism may be provided allowing assignment of the value to a preferred destination. In an embodiment, a portion of the escrow deposit may be assigned as a fee to a third party such as a system administrator.

In step 507, when the recovery challenge secret is valid, the recovery challenge may be broadcast to an output channel by the system of servers. The output channel may comprise a blockchain, an email list, a message board, a website, a web server, a database, an API, a push notification, or other mechanism for one-to-many communication. In step 508, an input channel may be monitored during a waiting period. In an embodiment, the waiting period may be at least the minimum waiting duration configured in the account. In step 509, a recovery response is received by the system of servers. In an embodiment, a user's client computer is responsible for transmitting or broadcasting the recovery response to the servers. The recovery response may comprise evidence of ownership of the account, such as a secret key or proof of private key ownership by using the private key to decrypt a value encrypted by the public key or encrypt a value that can be decoded by the public key, a password, a login to the account, or other evidence of ownership. In an example, the recovery response may be received from the account owner. In step 510, the evidence of ownership in the recovery response is verified by the system of servers. In an embodiment, the evidence of ownership may be verified by comparing the evidence of ownership to the authentication data in the account.

In step 511, when the evidence of ownership is valid, the first user forfeits all, or at least a portion, of the payment made into escrow. The funds may be transferred into any account not owned by the first user, or may be retained in the escrow account. In an embodiment, at least a portion of the escrow deposit may be paid to the account, and the recovery challenge is ended. In an embodiment, the escrow deposit may be paid to the account by assigning the value of the escrow deposit to the account directly, or a mechanism may be provided allowing assignment of the value to a preferred destination. In an embodiment, a portion of the escrow deposit may be assigned as a fee to a third party such as a system administrator.

In step 512, when the evidence of ownership is not valid, the recovery response is canceled. Steps 508-512 may be repeated. In step 513, when the waiting period elapses without a valid recovery response, the recovery mechanism may be used to provide account access to the first user and at least a portion of the escrow deposit may be returned or paid to the account. In an embodiment, the escrow deposit may be paid to the account by assigning the value of the escrow deposit to the account directly, or a mechanism may be provided allowing assignment of the value to a preferred destination. In an embodiment, a portion of the escrow deposit may be assigned as a fee to a third party such as a system administrator.

In some implementations, methods 200, 300, 400, 500 may be applied to blockchain accounts. A blockchain may be considered decentralized, due to the lack of a central controlling authority, and trustless, meaning that correct operation is achieved without users being required to trust each other or any entity. A blockchain may comprise a growing series of records, also known as blocks, which are linked using cryptography. Each block contains a cryptographic hash of the previous block, a timestamp, and a data payload. For example, the data payload may comprise one or more transaction records, timestamps, or other data submitted by users. In another example, the data payload may comprise one or more segments of executable code, records of code execution state, or results of executed code. Once recorded, the data in any given block cannot be altered retroactively without alteration of all subsequent blocks. A blockchain may be maintained by validators, also called miners or nodes, which are responsible for constructing new blocks and collaborating to operate a consensus mechanism which establishes the accepted state of the blocks in the blockchain. For example, a consensus mechanism may comprise proof of work, proof of stake, delegated proof of stake, or other byzantine fault tolerant mechanisms. A blockchain may be public or private. A public blockchain may allow anyone to participate, while a private blockchain may restrict participation to one or more sets of authenticated users.

A blockchain account may comprise a public key or address secured by a private key. The blockchain account may have contents associated with it, such as a value or other data. The contents of a blockchain account may be recorded on a blockchain. For example, the contents of a blockchain account may be the sum of all past transactions to the account minus the sum of all past transactions from the account. In some blockchains, the contents of blockchain accounts may be cryptographically protected such that only a user with the private key may view or modify the contents. In some blockchains, the contents of blockchain accounts may be viewable by all users, but changes to the contents may only be made by a user with the private key.

A blockchain transaction may comprise assigning at least a portion of the contents of a source blockchain account to a destination blockchain account. The source and destination blockchain accounts may have the same or different owners. The blockchain transaction may be completed by creating a transaction record, signing the transaction record with the private key of the source blockchain account, and submitting transaction record to the blockchain by broadcasting the signed transaction record to a plurality of validators in the blockchain. The validators may verify the signed transaction record, include the signed record in a block, and publish the block to the blockchain through the consensus mechanism. While verifying the signed transaction record, validators may check for errors such as incorrect transaction signature or insufficient contents in the source blockchain account to complete the transaction.

Methods 200, 300, 400, 500 may be well suited to recovery of blockchain accounts due to the distributed, trustless nature of blockchains. When the private key of a blockchain account is lost, there is no centralized record keeper to recover the private key. Without the private key, transaction of the contents of the blockchain account may be impossible. In some cases, a blockchain account owner may create and store back-up copies of the private key. However, back-up copies may still be lost, and depending on the storage medium may be susceptible to theft or other malicious activity.

Methods 200, 300, 400, 500 may also be beneficial for recovery of non-blockchain accounts such as email or social media. The methods may be implemented in replacement of or in addition to existing account recovery mechanisms. Benefits may include offering fewer points of failure, offering account recovery in a distributed manner, requiring less information to be retained, increasing anonymity, or reducing the need to link multiple accounts. Methods 200, 300, 400, 500 may be applied to accounts that are not cryptographically protected. In such an embodiment, the methods are performed in the same way but cryptography is not required to access or use the account.

Figure 6A:
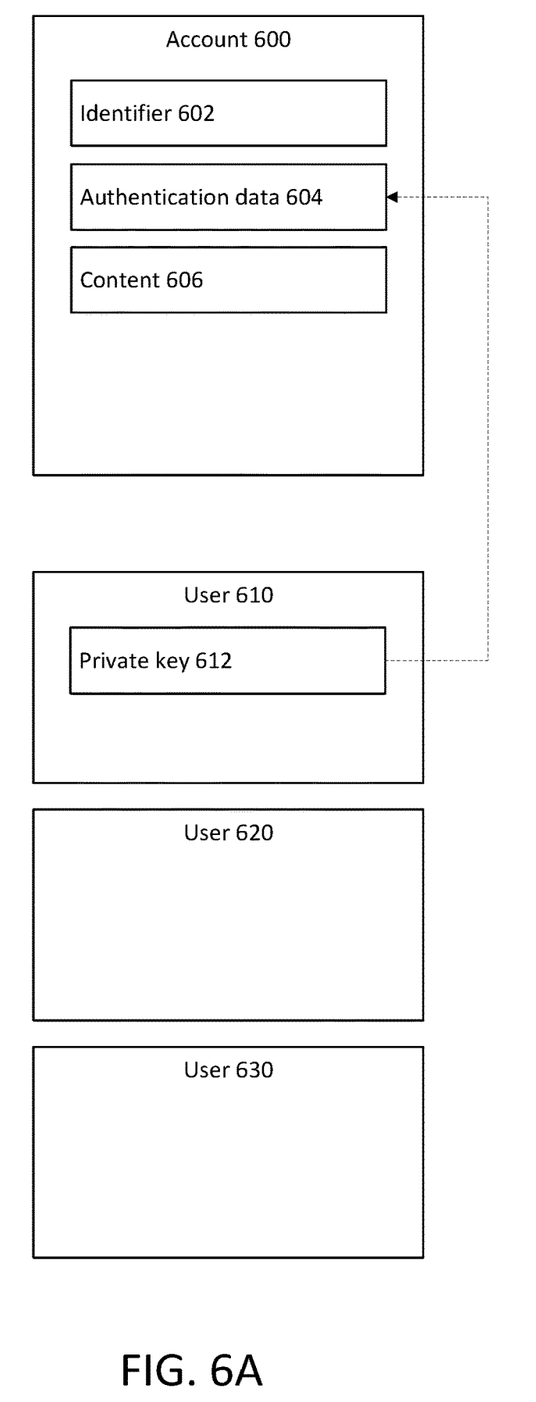
FIG. 6A illustrates an exemplary user and account environment with which some embodiments may be used.

FIG. 6A illustrates an exemplary user and account environment with which some embodiments may be used. The environment may include an account 600, comprising an identifier 602, authentication data 604, and content 606. Identifier 602 may comprise a username, address, number, string, or other mechanism for uniquely identifying the account. Authentication data 604 may comprise a plaintext password, a cryptographically protected password, a public key, or other data used to verify access. In an embodiment, authentication data may additionally comprise a recovery secret comprising a key or password. Content 604 may comprise one or more files, messages, transaction history, or permissions for adding, viewing, modifying, or deleting content data. The environment may include one or more users, 610, 620, 630. In this example, account 600 is owned by user 610 who possesses a private key 612 corresponding to authentication data 604. User 610 may access account 600 using private key 612. Users 620, 630 do not possess a private key corresponding to authentication data 604 and may not access account 600. Any user 610, 620, 630 in the environment may issue a recovery challenge to attempt to gain access to account 600.

Figure 6B:
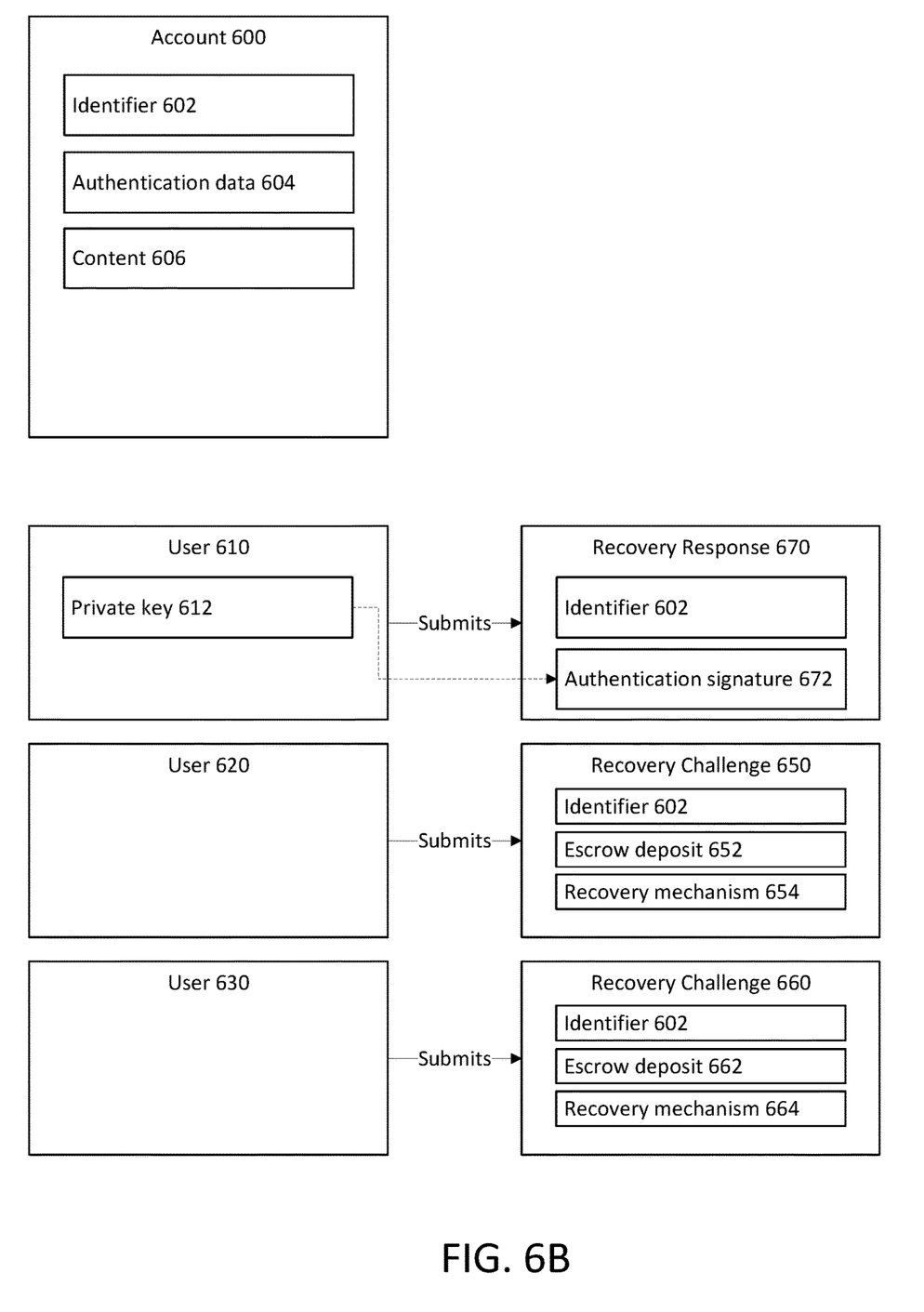
FIG. 6B illustrates an exemplary user and account interaction in one embodiment.

FIG. 6B illustrates an exemplary user and account interaction in one embodiment. Account 600 and users 610, 620, 630 are as described in FIG. 6A. For example, user 620 may submit a recovery challenge 650 comprising, identifier 602, an escrow transaction or deposit 652, and a recovery mechanism 654. Once recovery challenge 650 is received, recovery challenge 650 may be broadcast to all users. User 630 may subsequently submit recovery challenge 660 comprising identifier 602, an escrow transaction or deposit 662, and a recovery mechanism 664. Once recovery challenge 660 is received, recovery challenge 660 may be broadcast to all users.

In one example, user 610 may submit recovery response 670 comprising identifier 602 and an authentication signature 672 produced using private key 612. Once recovery response 670 is received and verified, existing recovery challenges 650, 660 on account 600 are cancelled, and at least a portion of escrow deposits 652, 662 are forfeited or paid to the submitter of recovery response 670. The loss of at least a portion of escrow deposits 652, 662 may discourage users 620, 630 from submitting frivolous recovery challenges. In an implementation, a recovery response may be automatically submitted when account access is authenticated in order to help users maintain ownership of an account. For example, recovery response 670 may be submitted automatically after account 600 is accessed using private key 612. In an implementation, a recovery response may be automatically submitted when an account use is authenticated in order to help account owners maintain ownership of an account. For example, recovery response 670 may be submitted automatically when content 606 in account 600 is viewed or modified using private key 612.

In an example, user 610 may not submit recovery response 670. For example, user 610 may be inactive, may not notice broadcast of recovery challenges 650, 660, may not care to retain account 600, or may have lost private key 612 and be unable to submit a valid recovery response. Recovery challenge 650 may expire without a valid recovery response, and recovery mechanism 654 may be used to grant account 600 to user 620. Escrow deposit 652 may be returned to user 620 or granted to account 600. Co-pending recovery challenges on account 600 such as recovery challenge 660 may be cancelled, and escrow deposit 662 may be returned to user 630 or granted to account 600.

Figure 6C:
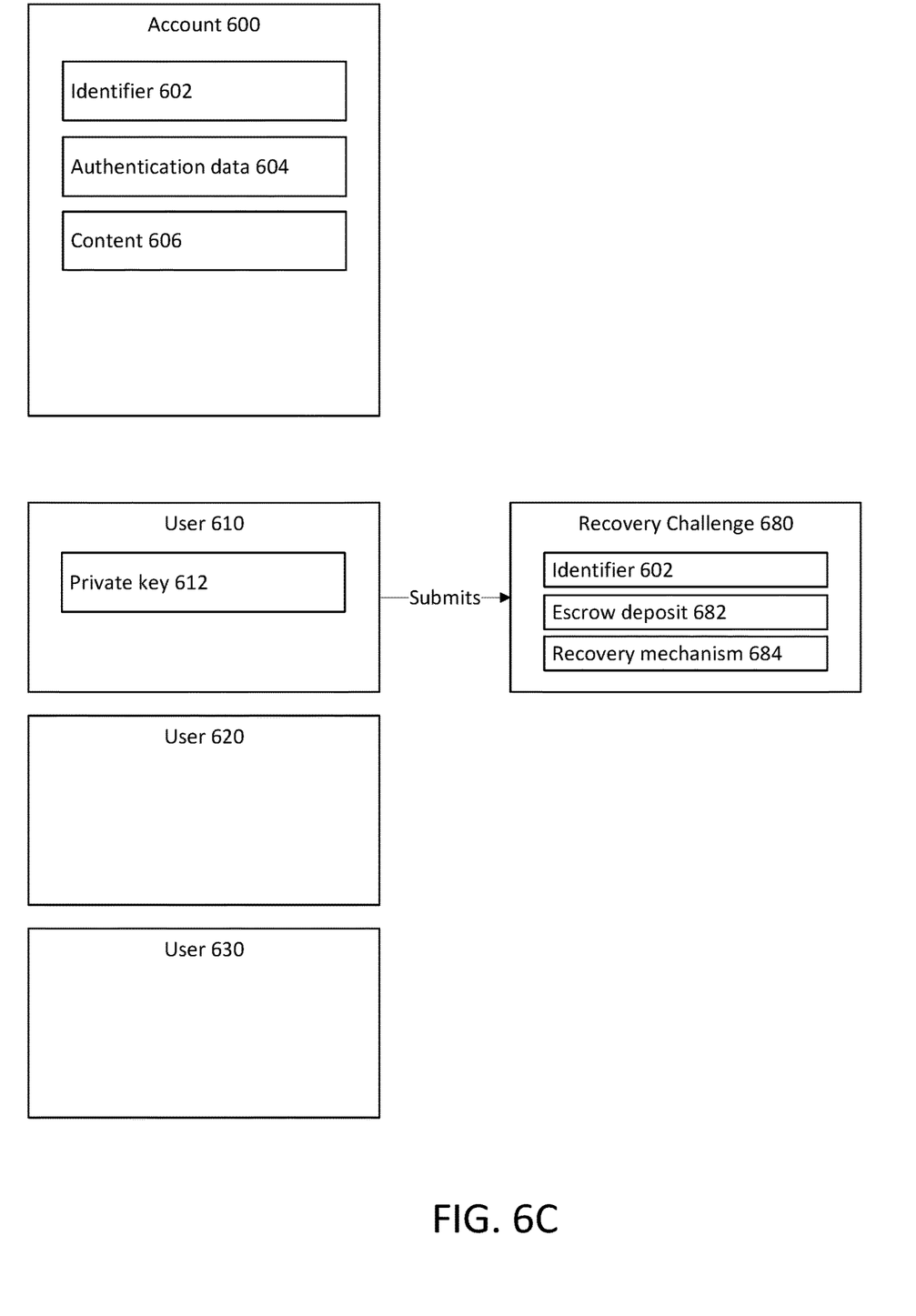
FIG. 6C illustrates an exemplary user and account interaction in one embodiment.

FIG. 6C illustrates an exemplary user and account interaction in one embodiment. Account 600 and users 610, 620, 630 are as described in FIG. 6A. In an example, user 610 may submit a recovery challenge 680 comprising identifier 602, an escrow transaction or deposit 682, and a recovery mechanism 684. In this example, no other user may submit a valid recovery response because the private key 612 is only known by user 610. When recovery challenge 680 expires without a valid recovery response, recovery mechanism 684 may be used to grant access to user 610. However, in some implementations, it may be possible for user 620 to intercept recovery challenge 680 and infer that access to account 600 is lost. It may be possible for user 620 to front-run recovery challenge 680 and gain access to account 600. In an implementation, a recovery challenge such as recovery challenge 680 may be automatically be submitted periodically on behalf of an account owner such as user 610, followed by an automatic submission of a valid recovery response. Automatic submission of recovery challenges may deter front-running by other users by creating a risk of loss of at least a portion of an escrow deposit associated with the front-running recovery challenge.

Figure 7:
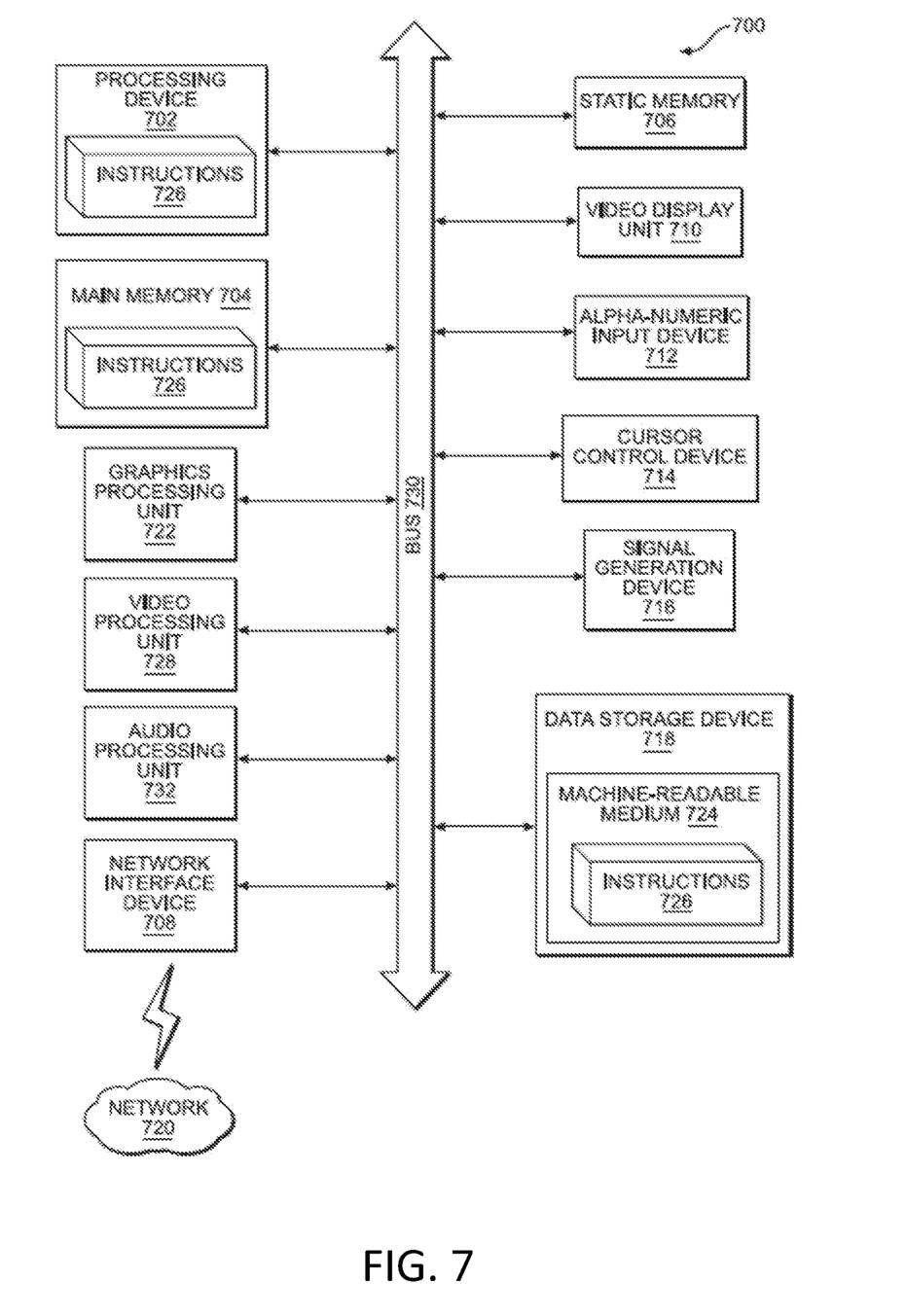
FIG. 7 illustrates an exemplary computer system in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 715 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the disclosure. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of providing for recovery of a cryptographically protected account comprising:
   configuring a cryptographically protected account with a monitoring period and a minimum challenge value using default values or a user input value, the account being accessible by a secret key or password;
   detecting a recovery notification from a first submitter, wherein the recovery notification comprises a hashed identifier of the cryptographically protected account;
   detecting a recovery challenge from the first submitter, wherein the recovery challenge comprises an identifier of the cryptographically protected account, an escrow deposit of at least the minimum challenge value, and a recovery mechanism;
   verifying that the recovery mechanism received in the recovery challenge is a valid pre-hash value for a recovery mechanism received in the recovery notification;
   broadcasting the existence of the recovery challenge;
   monitoring for recovery responses for a duration equal to the monitoring period;
   detecting a recovery response from a second submitter within the monitoring period, wherein the response comprises an identifier of the cryptographically protected account and a submitted key or password;
   determining validity of the recovery response by cryptographically verifying the submitted key or password;
   in response to determining the validity of the recovery response, retaining at least a portion of the escrow deposit or transferring at least a portion of the escrow deposit to an account not owned by the first submitter.

2. The method of claim 1, wherein the recovery mechanism comprises a public key for transferring account assets, an address for replacing the password, or a user submitted password replacement.

3. The method of claim 1, further comprising:
   verifying that the identifier received in the recovery challenge is a valid pre-hash value for the hashed identifier received in the recovery notification.

4. The method of claim 3, wherein the recovery notification further comprises a hashed recovery mechanism.

5. The method of claim 4, wherein the hashed recovery mechanism comprises a public key for transferring account assets, an address for replacing the password, or a user submitted password replacement.

6. The method of claim 1, further comprising:
transmitting a remaining portion of the escrow deposit to a third party.

7. The method of claim 1, further comprising:
submitting a recovery challenge automatically at random or fixed intervals;
submitting a valid recovery response automatically using the secret key or password within the monitoring period to maintain the account.

8. The method of claim 1, further comprising:
submitting a recovery response for the account when a user accesses the account.

9. The method of claim 1, further comprising:
submitting a recovery response for the account when a user takes an action in the account after accessing the account using the secret key or password.

10. The method of claim 1, wherein the cryptographically protected account is a blockchain account.

11. A non-transitory computer-readable medium comprising instructions for:
configuring a cryptographically protected account with a monitoring period and a minimum challenge value based on default values or a user input value, the account being accessible by a secret key or password;
detecting a recovery notification from a first submitter, wherein the recovery notification comprises a hashed identifier of the cryptographically protected account;
detecting a recovery challenge from the first submitter, wherein the recovery challenge comprises an identifier of the cryptographically protected account, an escrow deposit of at least the minimum challenge value, and a recovery transfer mechanism;
verifying that the recovery transfer mechanism received in the recovery challenge is a valid pre-hash value for a recovery transfer mechanism received in the recovery notification;
broadcasting the existence of the recovery challenge and the monitoring period;
monitoring for recovery responses for a duration equal to the monitoring period;
detecting a recovery response from a second submitter within the monitoring period, wherein the response comprises an identifier of the cryptographically protected account and a submitted key or password;
determining validity of the recovery response by cryptographically verifying the submitted key or password;
when the received recovery response is determined to be valid, transferring at least a portion of the escrow deposit to the second submitter and ending the recovery challenge;
when no verified recovery response is received during the monitoring period, providing access to the cryptographically protected account to the first submitter using the recovery transfer mechanism of the recovery challenge, and returning at least a portion of the escrow deposit to the first submitter.

12. The non-transitory computer-readable medium of claim 11, wherein the cryptographically protected account is a blockchain account.

13. The non-transitory computer-readable medium of claim 11, wherein the recovery notification further comprises a hashed recovery transfer mechanism.

14. The non-transitory computer-readable medium of claim 13, wherein the hashed recovery transfer mechanism comprises a public key for transferring account assets, an address for replacing the password, or a user submitted password replacement.

15. The non-transitory computer-readable medium of claim 11, wherein the recovery transfer mechanism further comprises a new account for transfer of the account assets, an address for sending a newly generated secret key, or a user submitted public key replacement.

16. A method of recovering access to a cryptographically protected account comprising:
configuring a cryptographically protected account with a monitoring period and a minimum challenge value based on default values or a user input value, the account being accessible by a secret key or password;
configuring the account with an account recovery secret based on a random generator or a user input value;
transmitting the account recovery secret to a user;
detecting a recovery notification from a first submitter, wherein the recovery notification comprises an encrypted or hashed identifier of the cryptographically protected account;
detecting a recovery challenge from the first submitter, wherein the recovery challenge comprises a decryption key or pre-hash value corresponding to the recovery notification, an escrow deposit of at least the minimum challenge value, an account recovery secret, and a recovery transfer mechanism;
verifying that the recovery transfer mechanism received in the recovery challenge is a valid pre-hash value for a recovery transfer mechanism received in the recovery notification;
verifying the account recovery secret;
in response to verifying the account recovery secret, broadcasting the existence of the recovery challenge and monitoring period;
monitoring for recovery responses for a duration equal to the monitoring period;
detecting a recovery response from a second submitter within the monitoring period, wherein the response comprises identification of the cryptographically protected account and a submitted key or password;
determining validity of the recovery response by cryptographically verifying the submitted key or password;
in response to determining the validity of the recovery response, transferring at least a portion of the escrow deposit to an account not owned by the first submitter.

17. The method of claim 16, further comprising:
generating a plurality of secret parts using a secret sharing algorithm, wherein the account recovery secret is recoverable based on a threshold number of the secret parts.

18. The method of claim 17, further comprising:
presenting one or more challenge questions to the user;
in response to receiving a valid answer to the one or more challenge questions, sending at least one of the secret parts to the user.

19. The method of claim 16, wherein the recovery transfer mechanism comprises a new account for receiving the account assets, an address for receiving a newly generated secret key, or a user submitted public key replacement.

* * * * *